July 7, 1953        F. S. HUMMEL        2,644,432

HOT WATER TANK

Filed June 1, 1949

Inventor
Frederick S. Hummel
by Douglas S. Johnson
atty.

Patented July 7, 1953

2,644,432

UNITED STATES PATENT OFFICE 2,644,432

HOT WATER TANK

Frederick S. Hummel, Toronto, Ontario, Canada, assignor to Triumph Dishwashers Limited, Toronto, Ontario, Canada Application June 1, 1949, Serial No. 96,535

3 Claims. (Cl. 122—13)

This invention relates to improvements in hot water tanks and more particularly to improvements in small horizontal tanks to be used in confined or restricted quarters, such as in washing machines or the like.

The principal object of the invention consists in providing a hot water tank which can be placed horizontally and from which a substantial volume of the tank's contents can be withdrawn at frequent intervals yet have an extremely constant uniform temperature independent of the temperature of the inlet water or the average temperature of the water throughout the tank.

A further and important object is to provide a hot water tank which will maintain a substantial volume of the contained water adjacent the tank outlet at a temperature more uniform and constant than the sensitivity of the controlling thermostat.

A still further object is to provide an extremely simple and economical as well as efficient horizontal hot water tank.

The principal feature of the invention consists in sub-dividing the tank into an upper and lower section having inter-communication at one locale only, to prevent free circulation therebetween, admitting water from the pressure source adjacent the bottom of the lower tank section into a baffle arrangement to reduce turbulence of the high velocity incoming pressure stream and prevent forceful circulation throughout the lower tank section, arranging a heater to provide maximum heat adjacent the lowest temperature water at the water inlet and locating the water outlet adjacent the top of the upper tank section to draw water from the hottest upper strata to which the highest temperature and consequently the least dense water from the lower section diffuses.

A further important feature consists in providing vertical separation between the water inlet and the confined area in communication between the upper and lower tank sections and the water outlet.

A still further important feature consists in controlling the heater with a thermostat responsive to temperature fluctuations in the lower tank section and locating the thermostat adjacent to but removed from the bottom of the lower tank section to be responsive to the average temperature fluctuations of the body of water in the lower tank section to provide a lesser temperature spread of the water in the upper tank section than the response range of the thermostat.

A still further feature consists in providing a formed opening between the tank sections to create a smooth flow therebetween.

Referring to the accompanying drawings, Figure 1 is a part elevational, part sectional view of a tank constructed in accordance with my invention.

Where space is not restricted hot water tanks are usually made as vertical tanks with the water inlet and the heating element located at the bottom and the hot water outlet located at the top. Due to natural circulation resulting from the changing density of the water with changing temperature the water in the tank stratifies, with the hottest and least dense water accumulating at the top where it may be withdrawn in small proportions of the tank's contents at substantially constant temperature.

There are many instances however where space is a limiting factor in the design of tanks and such large vertical tank construction is not permissible. For instance, both domestic and industrial units which incorporate their own hot water tanks require that the tank dimensions be maintained to a minimum and many cases require horizontal rather than vertical tanks. Such units in particular, such as washing machines for either clothes or dishes, provide restricted space and yet the function of the machine requires that a substantial volume of water at a uniform substantially constant temperature be delivered at frequent intervals.

Nowhere to my knowledge has a suitable small horizontal type tank been provided which would enable a large volume of its contents to be drawn at a constant or uniform temperature at frequent intervals.

It is therefore the specific object of this invention to provide a small tank for use in dishwashing machines or other units to provide a volume of water representing a substantial portion of its cubic contents having an extremely constant uniform temperature.

Figure 2:
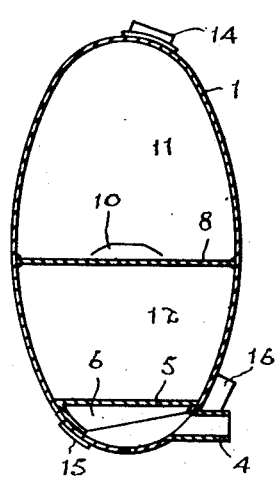
Figure 2 is a vertical sectional view taken on the line 2—2 of Figure 1.
Figure 1:
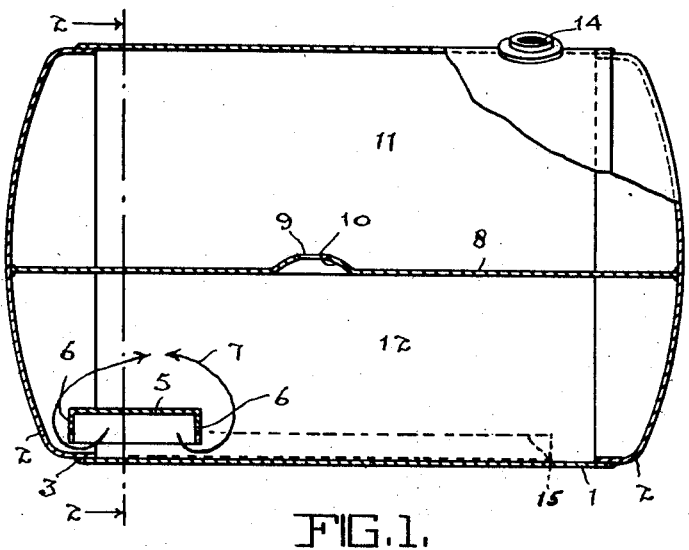

With reference to the drawings, it will be seen that my tank 1 has its major dimension or length horizontal as shown in Figure 1 and has a generally oval cross section as shown in Figure 2. The ends or caps 2 are inserted in and suitably welded to the tank body 1, being secured by the continuous bead weld 3 to provide a strong, sturdy tank structure.

Opening into the tank adjacent the bottom and preferably adjacent one end is the water inlet 4 to be connected to a pressure supply. This inlet 4 admits a pressure water stream having a substantially tangential flow with respect to the tank body.

Arranged above the inlet 4 and extending each side thereof is a baffle 5 which extends transversely across the tank and each of the edges of this baffle are turned down to provide the deflector plates 6 which increase in depth towards the side of the tank remote from the inlet 4.

It will therefore be seen from Figure 2 that the incoming tangential stream flow will be prevented from circulating around the inner perimeter of the tank, eliminating any of what I term "Orbital" flow of the pressure stream.

The baffle 5 will, as shown in Figure 1, cause the water which is directed across the tank to spread laterally, spilling out from under the deflecting plate 6 either side of the baffle, providing circulating currents, as indicated in Figure 1 by the arrows 7, which meet above the deflector where their velocity components cancel, allowing the water to stratify.

Arranged to extend transversely of the tank intermediate the height is a baffle partition 8 which is substantially a horizontal plate, and this plate is formed, as shown in Figure 1, with a single opening 9 adjacent the centre, the metal around the opening being bulged outwardly as at 10.

It will be seen that the baffle partition 8 divides the tank into a upper section 11 and a lower section 12 which are in communication at one confined area only through the opening 9.

Figure 4:
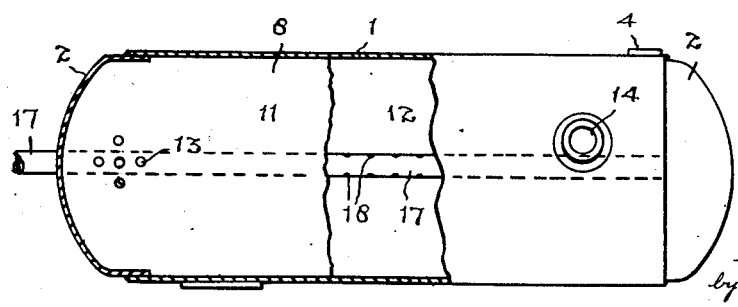
Figure 4 is a plan view of the tank of Figure 3 partly broken away to disclose the manner in which the perforations in the intermediate partition are grouped in a confined area and showing a modified inlet arrangement.

With the modification shown in Figure 4 the baffle partition 8 is provided with a plurality of grouped holes or openings 13 arranged at one end of the tank remote from the water inlet 4. In either case the area providing communication between the upper and lower tank sections is restricted to an extent to prevent free circulation of water between these two tank sections.

By free circulation I mean circulation in "orbital" flow where the circular or orbital path of the water has a radius which is any appreciable proportion of the vertical cross sectional dimensions of the tank.

As shown in Figure 1 the hot water outlet 14 is located at the top of the upper section 11 adjacent one end of the tank remote from the direct upward path of water moving upwardly through the baffle partition, that is, either through the single opening 9 or the grouped openings 13.

Figure 3:
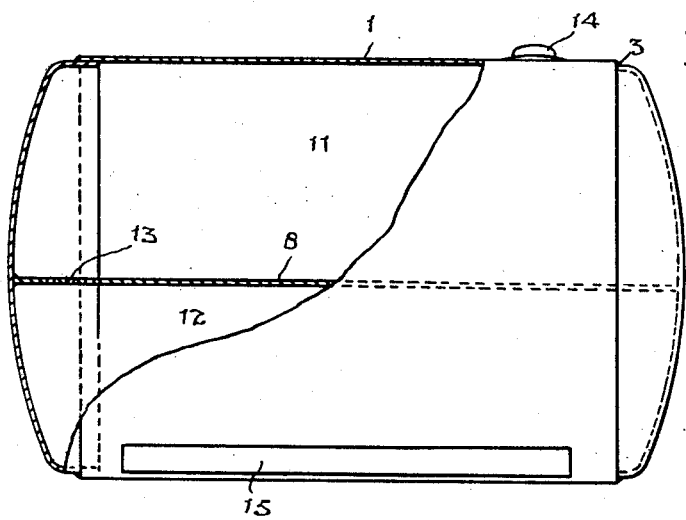
Figure 3 is a part elevational, part sectional view showing a slightly modified form of tank embodying my invention showing the water inlet and outlet and perforate partition area located at maximum separation.

As shown in Figure 3, the heating element for the tank consists of an elongated "strap-on" flat type of heater 15 which is arranged to extend substantially the full length of the tank along the bottom of the lower tank section 12.

It will be appreciated of course that suitable immersion type heaters or other heating elements may also be used with the restriction that the maximum heating effect must be applied at and adjacent the bottom of the tank.

Controlling the heater 15 is a suitable on-off control or thermostat 16 which may be a relatively inexpensive type having a fairly wide response range or low sensitivity. This thermostat 16 is located at an intermediate position between the bottom of the tank and the partition 8 where it will be subjected to the maximum water temperature fluctuations of the volume of water contained in the lower tank section 12.

Positioning the thermostat too close to either the tank bottom or the partition 8 will not give optimum results which in the present arrangement permits a thermostat having as high as a ten-degree spread between its on and off points of operation to control the temperature of the water adjacent the upper part of the upper tank section 11 to within one degree.

To reduce turbulence of the incoming water the rate of the water inflow may be controlled if desired but in the normal operation of the tank the baffle 5 and deflector side plates 6 provide a sufficient reduction in turbulence of incoming water flow to admit a large volume inflowing pressure stream.

As the water in the lower section is heated by the heater 15 its density decreases and under natural convection flow begins to rise. Thus warmer water will accumulate on the underside of the baffle partition 8 and a quantity of heat will be transferred through the partition to the body of water lying in the upper tank section.

The warmer or hot water will also move up into the upper tank section through the confined area of the baffle partition providing communication between the tank sections and will continue to rise and diffuse to the upper surface of the upper tank section.

The general movement of the heated water will be upward as a gently moving stream diffusing through the colder water which due to its greater density moves downwardly causing the upward displacement of the heated water. This convection flow will be a gentle flow with no turbulence, and, as only a confined area provides communication between the tank sections, there will be no circulating flow which would carry the hot water reaching the upper or adjacent the upper part of the upper tank section 11 back down therefrom to mix the hot and cold water strata.

This fact is extremely important as the water will stratify in layers with the hottest layer adjacent the upper part of the upper tank section from where it may be drawn through the outlet 14.

This arrangement has been found to permit almost two-thirds of the tank's contents to be drawn from the tank at a substantially constant temperature even though drawn in small quantities at successive intervals. When the water is withdrawn, cold water rushes through the inlet 4 but due to the baffle 5 its circulating tendency is reduced and it diffuses throughout the lower tank section.

It is the particular function of the baffle 5 to prevent water having any appreciable velocity and at a temperature adjacent the temperature of the incoming water from flowing adjacent to the opening 9 providing communication between the tank sections and carrying the hottest water of the lower tank section away from this opening.

The hottest water of the tank will tend to accumulate at the top of the upper section immediately above the area providing communication between the tank sections, and as this water tends to cool it will be displaced outwardly by the continued rise of the hottest water drifting or diffusing vertically upwardly.

The location of the water outlet 14 remote from immediately above the area in communication between the tank sections ensures that the water drawn through the outlet has the average temperature of the water strata.

In the modified tank as shown in Figure 4, the area in communication between the tank sections consists of the confined perforated area having the openings 13. In this particular modification the water inlet and the water outlet are located at the end of the tank remote from the openings 13, providing maximum distance the water must travel or diffuse between the inlet and outlet.

While my tank is extremely simple, it has been found to be exceedingly effective and may be made in small dimensions to fit in horizontal confined spaces where the vertical clearance will not permit normal vertical large tanks to be used.

In the modification of Figure 4, the baffle arrangement 5 is replaced by an essentially equivalent inlet comprising the longitudinal inlet pipe 17 extending inwardly from one end of the tank and having perforations 18 at the underside thereof to direct water around each side of the pipe to provide circulating currents, the velocity components of which will substantially cancel to eliminate circular or orbital flow around the lower tank section.

In actual practice a horizontal type tank constructed in accordance with my invention and having dimensions 21 inches long and 13 inches high and containing five imperial gallons has been used with a partition arrangement and baffled water inlet as described above and three and one half imperial gallons have been withdrawn at a substantially constant uniform temperature even though the pressure water stream entering through the water inlet 4 has a temperature difference of approximately 130° F. with the water drawn at the outlet 14.

It will thus be seen that the construction described forms an exceedingly effective separator arrangement to preclude inter-mixing of the hot and cold water masses for upon completion of the withdrawal of the hot water volume over two-thirds of the tank will have been filled with water at the inlet water temperature.

The results are especially significant in that the 3½ gallons or over two-thirds of the tank's contents can be withdrawn in successive small quantities over a short period of time and the baffle arrangement described will still effectively prevent circulation of the water to disturb the temperature of the water being withdrawn even under the action of the heater, which immediately comes on and sets up a natural convection flow as soon as the first body of water is withdrawn, as well as under the action of the incoming pressure stream.

This fact is extremely important in that in normal use it is this ability to provide quantities of water at frequent intervals at constant temperature that makes my tank particularly desirable.

What I claim as my invention is:

1. A hot water tank having a transverse partition arranged intermediate its height dividing the tank into an upper and a lower section and formed to provide communication between said sections at one confined area restricted to a size to permit a predetermined minimum of circulating currents between said sections; a water inlet leading into said lower section adjacent the bottom of said tank; baffle means to deflect inflowing water filling said tank through said inlet from circulating directly to said confined area at which communication between said sections is afforded; a water outlet leading from said upper section; a heater arranged to apply heat directly to the water within said lower tank section only; said upper tank section receiving the hottest and least dense water from said lower tank section forced upwardly through said restricted communicating area under inlet water pressure upon withdrawal of water from said upper section through said outlet and under displacement of relatively cooler water from said upper tank section diffusing downwardly through hotter water diffusing upwardly through said communicating area to maintain the water in said upper tank section at a substantially uniform high temperature free of any appreciable temperature gradient; and thermostat means to control said heater located to respond to water temperatures in said lower tank section; said water outlet being located, relative to said restricted area, remote from the direct upward path of water heated by said heater and diffusing upwardly through said communicating area and said upper tank section.

2. A hot water tank having a transverse partition arranged intermediate its height dividing the tank into an upper and a lower section and formed to provide communication between said sections within a confined area of a size to permit circulating currents between said sections having an orbital flow path of only a minor proportion of the dimensions of said tank; a water inlet leading into said lower section; a water outlet leading from said upper section; baffle means in said lower tank section arranged in the path of water which enters said inlet under withdrawal of water from said outlet, and deflecting such entering water away from said confined communicating area thereby permitting the less dense water of the lower tank section to collect immediately beneath said partition under convection transfer and to diffuse through said communicating area into said upper tank section; a heater arranged to provide maximum heat to the water at the bottom of said lower tank section and substantially out of direct thermal association with the water in said upper tank section to maintain the water fed to said upper tank section free of any appreciable temperature gradient; and means responsive to the temperature of water in said lower tank section to control said heater; said outlet being displaced away from the upward path of heated less dense water rising from said lower section through said confined communicating area.

3. A hot water tank sub-divided into an upper and a lower section in communication at one area only to permit a predetermined minimum of water circulation between said sections limiting any orbital flow to only minor proportions of the dimensions of said tank; an inlet in said lower section adjacent the bottom thereof remote from said communicating area and arranged to direct water into said tank in a substantially horizontal stream; an outlet from said upper section out of vertical alignment with said area of communication between said sections; a baffle arranged in said lower tank section extending substantially horizontally above the path of the inlet water stream and extending downwardly each side thereof to deflect flow of incoming water flowing through said inlet from said area; a heater in direct thermal contact with said lower tank section and substantially completely thermally disassociated from said upper tank section whereby said upper tank section is freed from any appreciable temperature gradient; and a thermostat located to respond to water temperature in said lower tank section in position to respond to substantially the maximum temperature fluctuation in said lower tank section to hold the temperature of upper water strata in the upper tank section at a temperature constancy having less fluctuation than the response of said thermostat.

FREDERICK S. HUMMEL.

References Cited in the file of this patent

UNITED STATES PATENTS

| Number | Name | Date |
|---|---|---|
| 1,581,907 | Barron | Apr. 20, 1926 |
| 1,847,431 | Hanna | Mar. 1, 1932 |
| 2,041,630 | Wright | May 19, 1936 |

FOREIGN PATENTS

| Number | Country | Date |
|---|---|---|
| 31,139 | Norway | Sept. 27, 1920 |
| 13,860 | Australia | Feb. 26, 1929 |